(12) United States Patent
Baba et al.

(10) Patent No.: US 9,372,073 B2
(45) Date of Patent: Jun. 21, 2016

(54) INNER DIAMETER MEASURING DEVICE

(71) Applicant: IHI Corporation, Koto-ku, Tokyo (JP)

(72) Inventors: Michiko Baba, Tokyo (JP); Kouzou Hasegawa, Tokyo (JP); Norimasa Taga, Tokyo (JP); Tooru Fujii, Tokyo (JP)

(73) Assignee: IHI Corporation, Tokyo (JP)

( * ) Notice: Subject to any disclaimer, the term of this patent is extended or adjusted under 35 U.S.C. 154(b) by 113 days.

(21) Appl. No.: 14/377,237

(22) PCT Filed: Feb. 7, 2013

(86) PCT No.: PCT/JP2013/053590
§ 371 (c)(1),
(2) Date: Aug. 7, 2014

(87) PCT Pub. No.: WO2013/118912
PCT Pub. Date: Aug. 15, 2013

(65) Prior Publication Data
US 2015/0002836 A1 Jan. 1, 2015

(30) Foreign Application Priority Data

Feb. 9, 2012 (JP) .................................. 2012-026045

(51) Int. Cl.
G01B 11/02 (2006.01)
G01B 11/12 (2006.01)
(Continued)

(52) U.S. Cl.
CPC ...... G01B 11/12 (2013.01); G01B 5/12 (2013.01); G01B 11/24 (2013.01); G02B 23/24 (2013.01)

(58) Field of Classification Search
CPC ......... G01B 11/24; G01B 11/12; G01B 11/00
USPC ......................................... 356/156, 630, 626
See application file for complete search history.

(56) References Cited

U.S. PATENT DOCUMENTS 1,664,851 A   4/1928   Class
1,721,524 A   7/1929   Moore
(Continued)

FOREIGN PATENT DOCUMENTS

EP   0076144 A2   4/1983
EP   0373514 A1   6/1990
(Continued)

OTHER PUBLICATIONS

International Search Report and Written Opinion mailed Apr. 23, 2013 in co-pending PCT application No. PCT/JP2013/053589.
(Continued)

Primary Examiner — Tarifur Chowdhury
Assistant Examiner — Isiaka Akanbi
(74) Attorney, Agent, or Firm — Nields, Lemack & Frame, LLC

(57) ABSTRACT

The invention relates to an inner diameter measuring device, having a non-contact measuring unit (3) and a contact measuring unit (4) arranged along the same center line, wherein the non-contact measuring unit comprises an image pickup unit (6) arranged on the center line, a laser beam emitting unit (7), and a laser beam diffusing unit (9) having a cone mirror, wherein a laser beam projected from the laser beam emitting unit to the cone mirror is reflected over a total circumference by the cone mirror, the image pickup unit takes an optical ring which is formed by projecting the reflected laser beam to an inner surface of a hollow portion, at least one of an inner diameter or a shape of the inner surface is measured based on an image picked up, and wherein the contact measuring unit comprises a contact measuring head (42) and a circulation unit (41) for circulating the contact measuring head around the center line, wherein the contact measuring head has a contact measuring unit having a contact at a forward end and for detecting a displacement of the contact, an advancing/retreating unit for advancing and retreating the contact measuring unit in radial direction, and a scale unit for measuring an advancing/retreating distance of the contact measuring unit.

7 Claims, 7 Drawing Sheets

(51) Int. Cl.
*G01B 11/24* (2006.01)
*G01B 5/12* (2006.01)
*G02B 23/24* (2006.01)

(56) References Cited

U.S. PATENT DOCUMENTS

| | | | |
|---|---|---|---|
| 2,822,620 A | 2/1958 | Ulfeldt | |
| 3,247,732 A | 4/1966 | Barnhart | |
| 3,436,967 A | 4/1969 | Post | |
| 3,771,350 A | 11/1973 | Romans | |
| 4,045,877 A | 9/1977 | Rutter | |
| 4,382,338 A | 5/1983 | Possati et al. | |
| 4,536,963 A | 8/1985 | Yamamoto et al. | |
| 4,631,834 A | 12/1986 | Hayashi et al. | |
| 4,872,269 A | 10/1989 | Sattmann | |
| 4,937,524 A | 6/1990 | Fasnacht et al. | |
| 4,967,092 A | 10/1990 | Fraignier et al. | |
| 5,083,384 A | 1/1992 | Possati et al. | |
| 5,095,634 A | 3/1992 | Overlach et al. | |
| 5,224,274 A | 7/1993 | Blaiklock | |
| 5,259,119 A | 11/1993 | Yoshioka et al. | |
| 5,808,250 A | 9/1998 | Torii et al. | |
| 5,933,231 A | 8/1999 | Bieman et al. | |
| 6,243,962 B1 | 6/2001 | Brock | |
| 6,249,007 B1 | 6/2001 | Gooch et al. | |
| 6,427,353 B1 | 8/2002 | Nelson et al. | |
| 6,931,149 B2 | 8/2005 | Hagene et al. | |
| 8,033,032 B2 | 10/2011 | Fujikawa et al. | |
| 8,841,603 B1 | 9/2014 | Blanton et al. | |
| 8,842,297 B2 | 9/2014 | Størksen et al. | |
| 9,145,924 B2 | 9/2015 | Baba et al. | |
| 2003/0198374 A1* | 10/2003 | Hagene | G01N 21/954 382/141 |
| 2004/0114793 A1* | 6/2004 | Bondurant | G01N 21/954 382/141 |
| 2006/0044089 A1 | 3/2006 | Kang et al. | |
| 2006/0112577 A1 | 6/2006 | Jones | |
| 2006/0283037 A1 | 12/2006 | Galle | |
| 2008/0105067 A1 | 5/2008 | Frey | |
| 2009/0144999 A1 | 6/2009 | Lau | |
| 2010/0005676 A1 | 1/2010 | Fujikawa et al. | |
| 2010/0060904 A1 | 3/2010 | Keightley et al. | |
| 2010/0110448 A1 | 5/2010 | Johnson et al. | |
| 2011/0080588 A1 | 4/2011 | Segall | |
| 2015/0000465 A1 | 1/2015 | Baba et al. | |
| 2015/0007440 A1 | 1/2015 | Baba et al. | |
| 2015/0009322 A1 | 1/2015 | Baba et al. | |
| 2015/0015695 A1 | 1/2015 | Baba et al. | |
| 2015/0015873 A1 | 1/2015 | Baba et al. | |
| 2015/0020395 A1 | 1/2015 | Baba et al. | |
| 2015/0131109 A1 | 5/2015 | Baba et al. | |

FOREIGN PATENT DOCUMENTS

| | | |
|---|---|---|
| EP | 1434076 A1 | 6/2004 |
| EP | 2818825 A1 | 12/2014 |
| FR | 2730304 A1 | 8/1996 |
| GB | 1388475 A | 3/1975 |
| JP | 50-159355 A | 12/1975 |
| JP | 57-22501 A | 2/1982 |
| JP | 58-66809 A | 4/1983 |
| JP | 59-187155 A | 10/1984 |
| JP | 61-144551 A | 7/1986 |
| JP | 61-282659 A | 12/1986 |
| JP | 63-55441 A | 3/1988 |
| JP | 63-159708 A | 7/1988 |
| JP | 1-195309 A | 8/1989 |
| JP | 3-502491 A | 6/1991 |
| JP | 5-62573 A | 3/1993 |
| JP | 7-55426 A | 3/1995 |
| JP | 7-29405 U | 6/1995 |
| JP | 7-191269 A | 7/1995 |
| JP | 8-14874 A | 1/1996 |
| JP | 8-93876 A | 4/1996 |
| JP | 9-311034 A | 12/1997 |
| JP | 10-137962 A | 5/1998 |
| JP | 10-197215 A | 7/1998 |
| JP | 10-213404 A | 8/1998 |
| JP | 2000-136923 A | 5/2000 |
| JP | 2000-146564 A | 5/2000 |
| JP | 2002-22671 A | 1/2002 |
| JP | 2002-148036 A | 5/2002 |
| JP | 2003-139525 A | 5/2003 |
| JP | 2003-329606 A | 11/2003 |
| JP | 2004-176852 A | 6/2004 |
| JP | 3105724 U | 11/2004 |
| JP | 2005-315814 A | 11/2005 |
| JP | 2005-331333 A | 12/2005 |
| JP | 2006-153546 A | 6/2006 |
| JP | 2006-156138 A | 6/2006 |
| JP | 2006-229551 A | 8/2006 |
| JP | 2006-234525 A | 9/2006 |
| JP | 2007-57305 A | 3/2007 |
| JP | 2007-71852 A | 3/2007 |
| JP | 2007-248465 A | 9/2007 |
| JP | 2007-292699 A | 11/2007 |
| JP | 4230408 B2 | 2/2009 |
| JP | 2010-164334 A | 7/2010 |
| JP | 2011-2439 A | 1/2011 |
| JP | 2011-13060 A | 1/2011 |
| WO | 97/02480 A1 | 1/1997 |
| WO | 2007/051332 A2 | 5/2007 |
| WO | 2009152851 A1 | 12/2009 |
| WO | 2013/118918 A1 | 8/2013 |

OTHER PUBLICATIONS

International Preliminary Report on Patentability mailed Aug. 21, 2014 in co-pending PCT application No. PCT/JP2013/053589.
International Search Report and Written Opinion mailed Apr. 2, 2013 in corresponding PCT application No. PCT/JP2013/053590.
International Preliminary Report on Patentability mailed Aug. 21, 2014 in corresponding PCT application No. PCT/JP2013/053590.
International Search Report and Written Opinion mailed Apr. 23, 2013 in co-pending PCT application No. PCT/JP2013/053591.
International Preliminary Report on Patentability mailed Aug. 21, 2014 in co-pending PCT application No. PCT/JP2013/053591.
International Search Report and Written Opinion mailed May 7, 2013 in co-pending PCT application No. PCT/JP2013/053592.
International Preliminary Report on Patentability mailed Aug. 21, 2014 in co-pending PCT application No. PCT/JP2013/053592.
International Search Report and Written Opinion mailed Mar. 12, 2013 in co-pending PCT application No. PCT/JP2013/053599.
International Preliminary Report on Patentability mailed Aug. 21, 2014 in co-pending PCT application No. PCT/JP2013/053599.
International Search Report and Written Opinion mailed May 7, 2013 in co-pending PCT application No. PCT/JP2013/053597.
International Preliminary Report on Patentability mailed Aug. 21, 2014 in co-pending PCT application No. PCT/JP2013/053597.
International Search Report and Written Opinion mailed Apr. 16, 2013 in co-pending PCT application No. PCT/JP2013/053598.
International Preliminary Report on Patentability mailed Aug. 21, 2014 in co-pending PCT application No. PCT/JP2013/053598.
International Search Report and Written Opinion mailed Apr. 2, 2013 in co-pending PCT application No. PCT/JP2013/053603.
International Preliminary Report on Patentability mailed Aug. 21, 2014 in co-pending PCT application No. PCT/JP2013/053603.
Office Action mailed Mar. 25, 2015 in co-pending U.S. Appl. No. 14/377,225.
Notice of Allowance mailed Jul. 13, 2015 in co-pending U.S. Appl. No. 14/377,225.
European communication dated Sep. 9, 2015 in co-pending European patent application No. 13746779.1.
Office action mailed Sep. 1, 2015 in co-pending U.S. Appl. No. 14/377,238.
European communication dated Oct. 7, 2015 in corresponding European patent application No. 13747245.2.
European communication dated Sep. 9, 2015 in co-pending European patent application No. 13746053.1.

(56) References Cited

OTHER PUBLICATIONS

European communication dated Nov. 11, 2015 in co-pending European patent application No. 13746339.4.
European communication dated Oct. 8, 2015 in co-pending European patent application No. 13746993.8.
Office action mailed Dec. 1, 2015 in co-pending U.S. Appl. No. 14/377,227.
European communication dated Sep. 4, 2015 in co-pending European patent application No. 13747139.7.
European communication dated Sep. 18, 2015 in co-pending European patent application No. 13746866.6.
European communication dated Sep. 14, 2015 in co-pending European patent application No. 13746596.9.
Final rejection mailed Dec. 29, 2015 in co-pending U.S. Appl. No. 14/377,238.
Office action mailed Dec. 30, 2015 in co-pending U.S. Appl. No. 14/377,226.
Office action mailed Mar. 22, 2016 in co-pending U.S. Appl. No. 14/377,238.
Office action mailed Apr. 18, 2016 in co-pending U.S. Appl. No. 14/377,230.
Notice of allowance mailed Mar. 30, 2016 in co-pending U.S. Appl. No. 14/377,227.

* cited by examiner

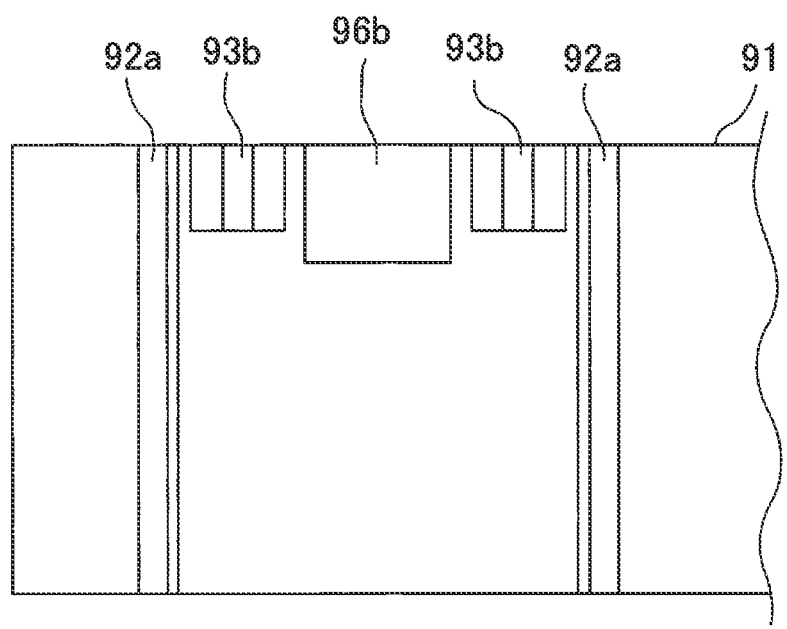
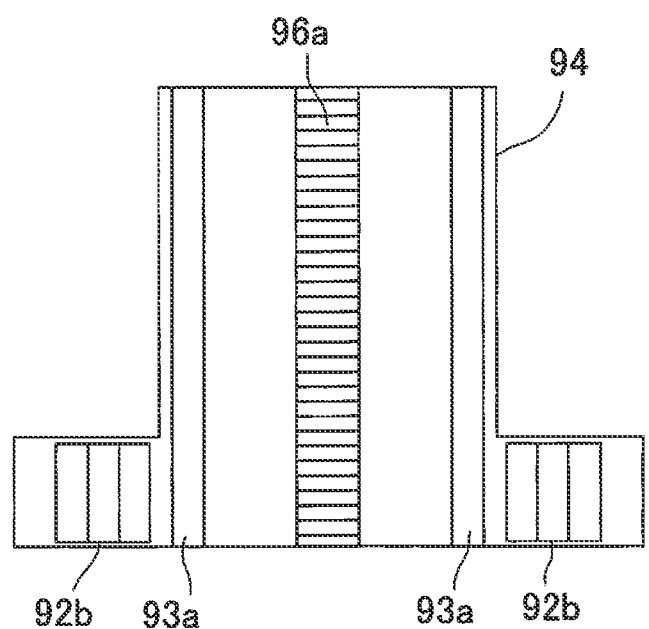

INNER DIAMETER MEASURING DEVICE

TECHNICAL FIELD

The present invention relates to an inner diameter measuring device for measuring an inner diameter of a hollow member.

BACKGROUND ART

As a device for measuring an inner diameter of a hollow member, a non-contact type inner diameter measuring device is known, which projects a laser beam over total circumference, forms an optical ring on inner surface, takes an image of an optical ring thus formed, and measures inner diameter, shape, and profile of the hollow member on the image. Also, an inner diameter measuring device is known, which brings contact to inner surface of the hollow member with a contact, and measures the inner diameter.

As a non-contact type inner diameter measuring device, the devices disclosed in the Patent Document 1 and the Patent Document 2 are known. According to each of the Patent Document 1 and the Patent Document 2 discloses a non-contact type inner diameter measuring device, a laser beam is projected over total circumference, an optical ring formed on inner surface of a cylindrical object is photographed and shape and diameter of the optical ring is measured on the image.

Further, as a contact type inner diameter measuring device, a device disclosed in the Patent Document 3 is known. According to the Patent Document 3, a pipe no be inspected is rotatably supported by a pipe rotation supporting device, and the device comprises a running carriage device where a pair of upper and lower inner diameter measuring sensors are provided in closely separable manner. By operating the running carriage device, the inner diameter measurement sensor is inserted into the inside of the pipe to be inspected. By separating the inner diameter measuring sensor in upper and lower directions, the sensor is brought into contact with inner surface of the pipe to be inspected. Further, the pipe to be inspected is rotated by the pipe rotation supporting device, and inner diameter of the pipe to be inspected is measured.

By the non-contact type inner diameter measuring device in the former case, a shape and a condition of the inner surface can be quickly identified, and it is advantageous in that the measurement can be carried out within shorter time, and the conditions of inner surface such as graded step, taper, etc. at one time, and entire shape and condition can be identified, while there is a problem that the measurement with high accuracy cannot perform.

By the contact type inner diameter measuring device in the latter case, the measurement results with high accuracy can be obtained, while measurement must be performed one by one and much time is required. Further, measurement must be performed at a multiple of points for measuring a shape of inner surface, and a long time is required for the measurement. Also, there are problems in that it is difficult to identify the conditions of inner surface such as graded step, taper, etc.

To solve the problems as described above, it is an object of the present invention to provide an inner diameter measuring device, by which it is possible to quickly identify the conditions of the inner surface and entire shape, and moreover, to obtain the measurement results with higher accuracy.

CONVENTIONAL ART REFERENCES

Patent Document 1: JP-A-H10-197215
Patent Document 2: JP-A-2010-164334
Patent Document 3: JP-A-2000-136923

DISCLOSURE OF THE INVENTION

The present invention relates to an inner diameter measuring device, having a non-contact measuring unit and a contact measuring unit arranged along the same center line, wherein the non-contact measuring unit comprises an image pickup unit arranged on the center line, a laser beam emitting unit, and a laser beam diffusing unit having a cone mirror, wherein a laser beam projected from the laser beam emitting unit to the cone mirror is reflected over a total circumference by the cone mirror, the image pickup unit takes an optical ring which is formed by projecting the reflected laser beam to an inner surface of a hollow portion, at least one of an inner diameter or a shape of the inner surface is measured based on an image picked up, and wherein the contact measuring unit comprises a contact measuring head and a circulation unit for circulating the contact measuring head around the center line, wherein the contact measuring head has a contact measuring unit having a contact at a forward end and for detecting a displacement of the contact, an advancing/retreating unit for advancing and retreating the contact measuring unit in radial direction, and a scale unit for measuring an advancing/retreating distance of the contact measuring unit.

Further, the present invention relates to an inner diameter measuring device, wherein the non-contact measuring unit and the contact measuring unit are configured so as to be included within the same cylindrical surface.

Further, the present invention relates to an inner diameter measuring device, further comprising a centering unit arranged on the same center line, wherein the laser beam emitting unit is mounted on the centering unit via the centering unit, the position of the centering unit can be adjusted in two directions perpendicularly crossing with respect to the center line of the laser beam, and also, a tilting of an optical axis of the laser beam emitting unit can be adjusted.

Further, the present invention relates to an inner diameter measuring device, wherein the contact measuring head is so arranged that a center of gravity of the contact measuring head exists within a predetermined range with the center line as the center.

Further, the present invention relates to an inner diameter measuring device, wherein the contact measuring unit is provided on a measuring unit holder movable in radial direction along an advancing/retreating guide rail, a linear scale is provided in parallel to the advancing/retreating guide rail, a scale sensor is provided on the measuring unit holder, and the advancing/retreating distance of the contact measuring unit is measured by the scale sensor.

Further, the present invention relates to an inner diameter measuring device, wherein the contact measuring head has a measuring unit supporting base plate circulated by the circulation unit, the advancing/retreating unit is provided on the measuring unit supporting base plate via two sets of linear guides, each linear guide comprises a pair of advancing/retreating guide rails and a pair of blocks respectively slidably engaged with the advancing/retreating guide rail, wherein with respect to one of the linear guides, the advancing/retreating guide rail is provided on the measuring unit supporting base plate and the block is provided, on the advancing/retreating unit, and with respect to the other of the linear guides, the advancing/retreating guide rail is provided on the advancing/retreating unit and the block is provided on the measuring unit supporting base plate.

BRIEF DESCRIPTION OF THE DRAWINGS

FIG. 6A and FIG. 6B are explanatory drawings of a linear scale in a second embodiment.

BEST MODE FOR CARRYING OUT THE INVENTION

Description will be given below on an embodiment of the present invention by referring to the attached drawings.

Figure 1:
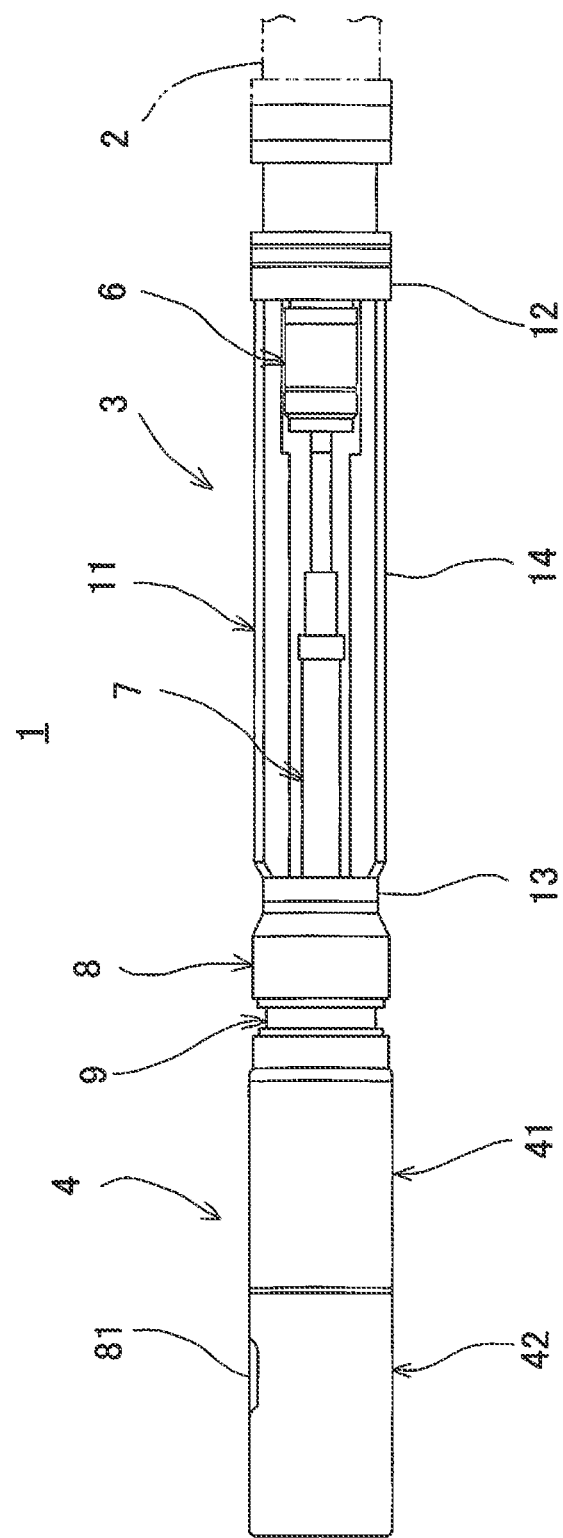
FIG. 1 is an overall side view of an inner diameter measuring device according to an embodiment of the present invention.

FIG. 1 shows an embodiment according to the present invention. In FIG. 1, reference numeral 1 denotes an inner diameter measuring device, and reference numeral 2 denotes a rod-like supporting member for supporting the inner diameter measuring device 1.

The inner diameter measuring device 1 is designed in a shape, which can be included in a cylindrical surface. The cylindrical surface can also include the supporting member 2 and the cylindrical surface is designed to be shorter than the inner diameter of a hollow portion of an object to be measured.

The inner diameter measuring device 1 comprises a non-contact measuring unit 3 and a contact measuring unit 4. The non-contact measuring unit 3 and the contact measuring unit 4 are arranged along an extension of a centerline of the supporting member 2. Further, the non-contact measuring unit 3 and the contact measuring unit 4 are arranged in such manner that the contact measuring unit 4 can be connected or disconnected from each other.

First, description will be given on the non-contact measuring unit 3 by referring to FIG. 2.

The non-contact measuring unit 3 primarily comprises an image pickup unit 6, a laser beam emitting unit 7, a centering unit 8, a laser beam diffusing unit 9, a frame unit 11, etc. Also, an optical axis of the image pickup unit 6, an optical axis of the laser beam emitting unit 7, a centerline of the centering unit 8, a center line of the laser beam diffusing unit 9, and a center line of the frame unit 11 coincide with the center line of the supporting member 2.

The frame unit 11 is constituted in such a manner that a base end ring 12 and a forward end ring 13 are connected with each other by a plurality of supporting pillars 14. The supporting pillars 14 are arranged on the same circumference at positions with predetermined distance, e.g. at three equally distanced positions. At the center of the frame unit 11, a space penetrating from die base end to the forward end is formed.

The image pickup unit 6 is mounted on the base end ring 12. The image pickup unit 6 has a camera holder 15 to be mounted on the base end ring 12 and a camera 16 to be accommodated in the camera holder 15. The camera holder 15 is connected to the supporting member 2. An optical axis of the camera 16 coincides with the center line of the supporting member 2 and the center line of the frame unit 11.

The camera 16 has a CCD or a CMOS sensor, etc., which is an aggregate of pixels, as an image pickup element. The image pickup element outputs digital image signals, which are an aggregate of signals from each pixel, and it is so arranged that signals from each pixel can identify positions respectively within the image pickup element.

The centering unit 8 is fixed on the forward end ring 13, and the laser beam diffusing unit 9 is fixed on a forward end of the centering unit 8. An axis adjusting mechanism 18 is accommodated in the centering unit 8, and the laser beam emitting unit 7 is mounted on a base end side of the axis adjusting mechanism 18.

The laser beam emitting unit 7 has a light emitter holder 19 of pipe-like shape to be fixed on the axis adjusting mechanism 18, and a laser emitter 20 fitted into and attached to the base end portion of the light emitter holder 19, and an optical axis of the laser beam 21 emitted from the laser emitter 20 coincides with optical axis of the camera 16 and with the center line of the frame unit 11.

On a central part of the axis adjusting mechanism 18, an optical path hole 23 where the laser beam 21 passes through is formed. The axis adjusting mechanism 18 has an X-axis slider 25, which perpendicularly crosses the laser beam 21 and slides in a direction perpendicular to paper surface, and also, has a Y-axis slider 26, which is provided on the X-axis slider 25 and slides in a direction in parallel to the paper surface. It is so arranged that positions of the X-axis slider 25 and the Y-axis slider 26 can be adjusted by adjusting screws (not shown) respectively.

The light emitter holder 19 is mounted on the Y-axis slider 26. Further, the light emitter holder 19 is fixed at three equally divided positions on circumference by fixing means 27 having a pair of pushing screw and pulling screw. By adjusting the fixing means 27, tilting of the center line of the light emitter holder 19, i.e. tilting of optical axis of the laser beam 21 can be adjusted.

It is so arranged that a position of an optical axis of the laser beam 21 can be adjusted in two directions perpendicularly crossing each other, i.e. in X-axis direction and in Y-axis direction, and a tilting of the optical axis can be adjusted by the fixing means 27, and also, that optical axis of the laser beam 21 can coincide with a center line of the image pickup unit 6 and a center line of a cone mirror 29 (to be described later).

At a forward end of the centering unit 8, a laser beam diffusing unit 9 is provided, and the laser beam diffusing unit 9 has a cone mirror 29 on the center line and a total circumferential light transmitting window 30, which is concentric to the cone mirror 29. The cone mirror 29 has a conical curved surface with an end pointed toward the laser emitter 20, and vertical angle of the curved surface is set to 90°, for instance. The cone mirror 29 can be changed as appropriate to the one having different vertical angle, depending on the measurement circumstance, e.g. with vertical angle of 120° or 60°.

Under the condition that the center line of the cone mirror 29, the optical axis of the laser beam 21, and the optical axis of the camera 16 coincide with each other, when the laser beam, 21 is projected from the laser emitter 20, the laser beam 21 enters vertex of the cone mirror 29 and is reflected in total circumferential direction by conical curved surface. When a reflected laser beam 21' which passed through the total circumferential light transmitting window 30 is projected to inner surface of hollow portion, an optical ring is formed. The optical ring is picked up by the camera 16.

It is to be noted that there may be two or four supporting pillars 14. There is no problem in so far as the supporting pillars 14 can support the image pickup unit 6, the centering unit 8, and the laser beam diffusing unit 9, and no trouble is caused in the image pickup of the image pickup unit 6.

Figure 2:
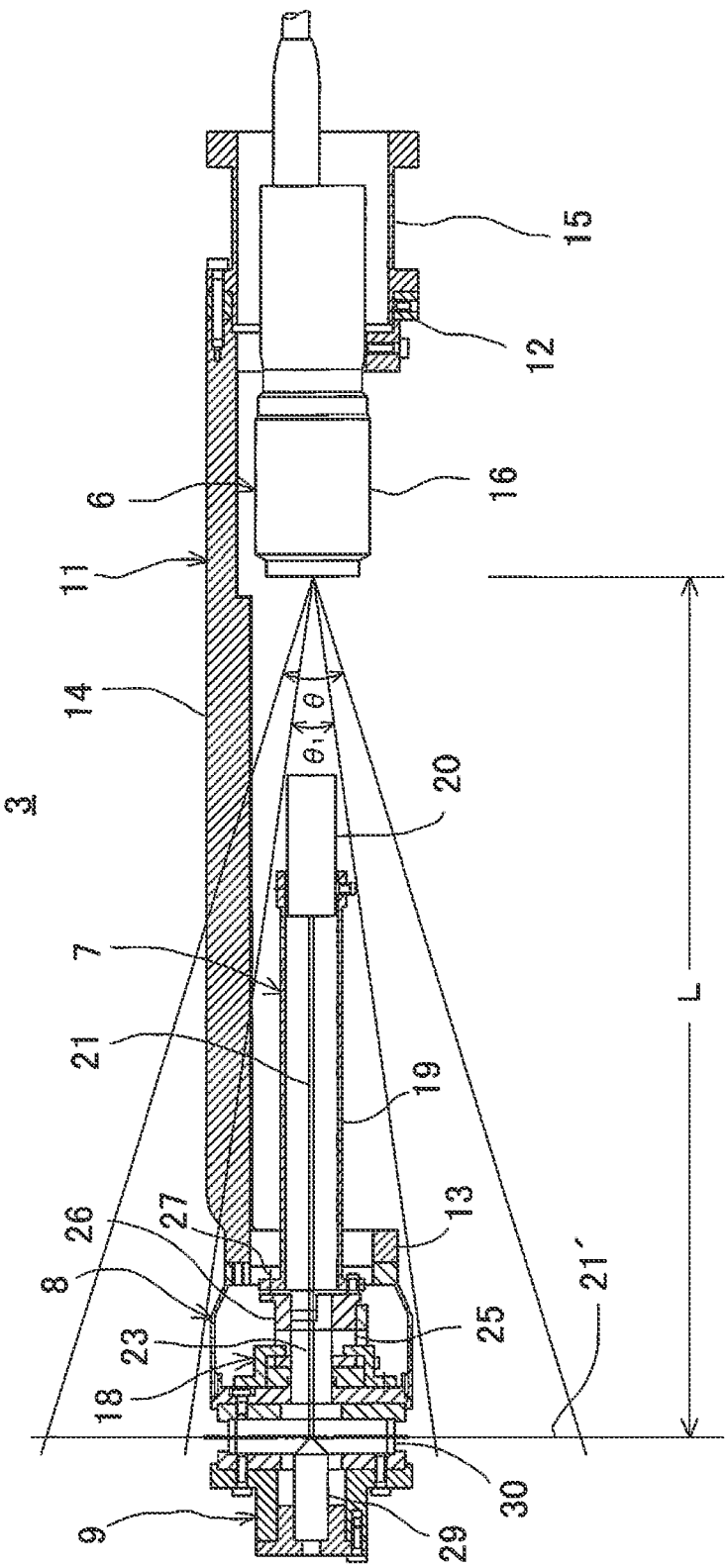
FIG. 2 is a cross-sectional view of a non-contact measuring unit of the inner diameter measuring device.

As shown in FIG. 2, it is supposed that field angle of the camera 16 is θ, and that a field angle is θ1, which is turned to a dead angle as the field angle is intercepted by the laser emitter 20, the centering unit 8, etc. Then, inner diameter of a hollow portion can be measured in the range of (θ1 to θ). If it is supposed that a distance from the camera 16 to the vertex of the cone mirror 29 is L, the range of inner diameter, which can be measured, will be: (2L tan θ1/2 to 2L tan θ/2).

A measuring unit main part (not shown) has an image processing unit. The image processing unit processes the image picked up by the camera. 16, and measures an inner diameter and a shape (true circle, ellipse, etc.), or at least one of the inner diameter and the shape. Further, under the condition that the reflected laser beam 21' is projected, when the inner diameter measuring device 1 is moved in axial direction, and images are acquired, an information such as condition of inner surface, e.g. taper, graded step, etc., can be acquired.

By referring to FIG. 3 and FIG. 4, description will be given on the contact measuring unit 4.

Figure 3:
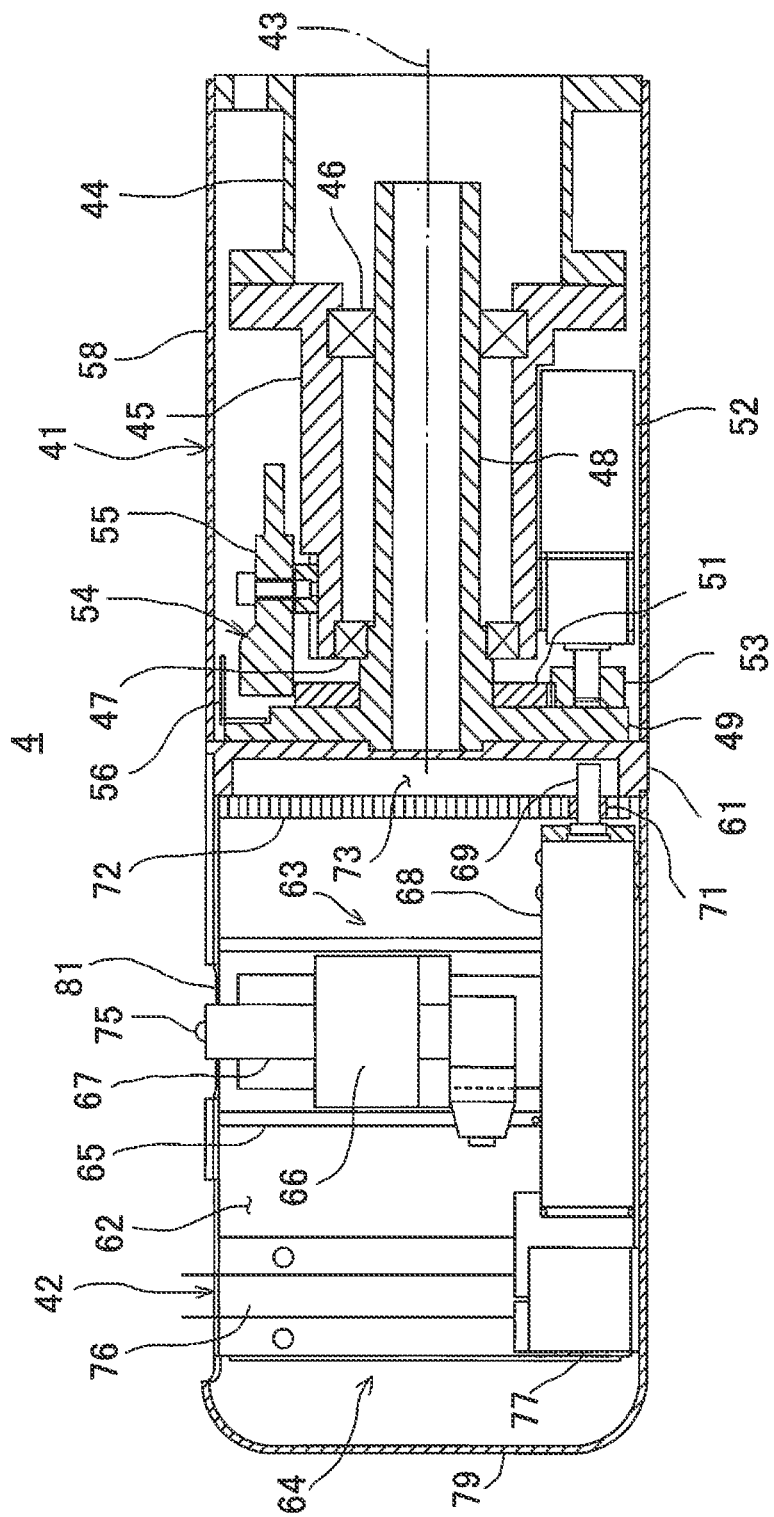
FIG. 3 is a cross-sectional view of a contact measuring unit of the inner diameter measuring device.
Figure 4:
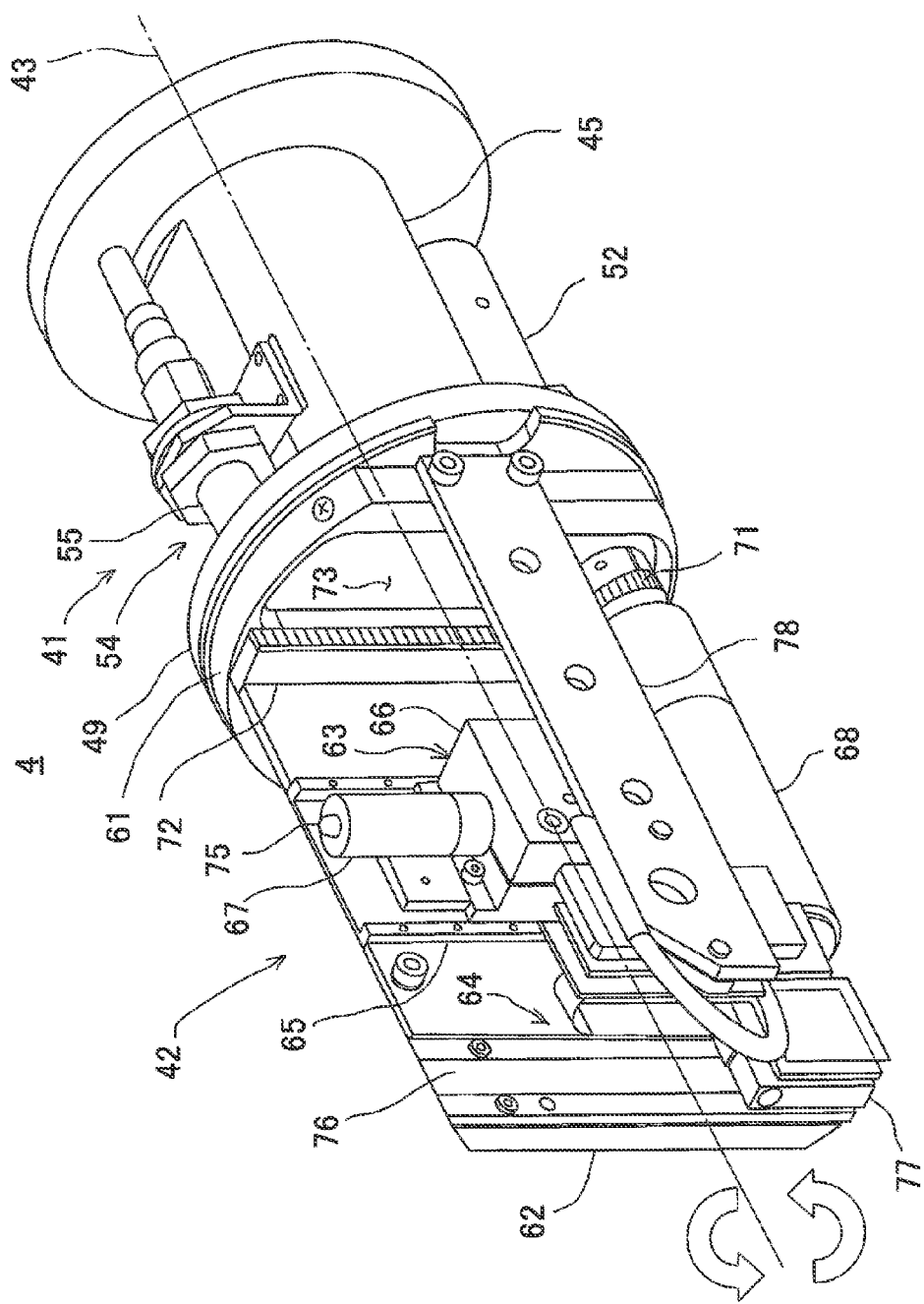
FIG. 4 is a perspective view of the contact measuring unit in a condition where a circulation unit cover and a measuring head cover are removed.

In FIG. 3 and FIG. 4, reference numeral 41 denotes a circulation unit, reference numeral 42 denotes a contact measuring head, and reference numeral 43 denotes a center line of the contact measuring unit 4.

First, description will be given on the circulation unit 41.

A center line of the circulation unit 41 coincides with a center line of the supporting member 2 and with a center line of the non-contact measuring unit 3. Further, a connection adapter 44 is provided at a base end, and the circulation unit 41 is connected to the non-contact measuring unit 3 via the connection adapter 44 or the circulation unit 41 is connected with the supporting member 2.

A shaft holder 45, which is hollow, is mounted on the connection adapter 44. A center line of the shaft holder 45 coincides with the center line 43, and a circulation shaft 48 is rotatably supported around the center line 43 via bearings 46 and 47. For the purpose of reducing the weight, it is preferable that the circulation shaft 48 is designed as hollow.

At a forward end (on the left side in FIG. 3) of the circulation shaft 48, a circulation flange 49 is formed. Further, on base side of the circulation flange 49, a circulation gear 51 is engaged with the circulation shaft 48.

At a position as required on outer surface of the shaft holder 45, a circulation motor 52 is provided. A circulation driving gear 53 is fitted and fixed on an output shaft of the circulation motor 52, and the circulation driving gear 53 is engaged with the circulation gear 51. Further, the circulation motor 52 has an encoder (not shown), and the amount of rotation of the circulation driving gear 53, i.e. the amount of rotation of the circulation gear 51, can be detected.

At a position as required on the shaft holder 45 and at a position not interfering with the circulation motor 52, a circulation restricting means 54 of she circulation flange 49 is provided. As one example of the circulation restricting means 54, a limit switch 55 is provided on the shaft holder 45, and a switch operating piece 56 to operate the limit switch 55 is attached on the circulation flange 49. In the present embodiment, a proximity switch is used as the limit switch 55, and a metal piece, which is set so as to face each other the limit switch 55 at an interval as required, is used as the switch operating piece 56.

A circulation unit cover 58 in cylindrical shape to cover the connection adapter 44, the shaft holder 45, the circulation flange 49, the circulation motor 52 and she circulation restricting means 54 is provided to stretch over from the base end of the connection adapter 44 to the circulation flange 49. The circulation unit cover 58 is not contacted with the circulation flange 49.

Next, description will be given on the contact measuring head 42.

The contact measuring head 42 has a circulation base plate 61 at base end, and since the circulation base plate 61 is fixed on the circulation flange 19, the circulation unit 41 and the contact measuring head 42 are connected with each other and it is so comprised that the circulation unit 41 and the contact measuring head 42 are integrated with each other. The contact measuring head 42 is concentric with the circulation unit 41, i.e. the contact measuring head 42 is concentric with the laser beam emitting unit 7. That is, the circulation unit 41, the contact measuring head 42 and the laser beam emitting unit 7 are so arranged that the center line and the optical axis of each of the circulation unit 41, the contact measuring head 42 and the laser beam emitting unit 7 coincide with the center line 43.

A measuring unit supporting base plate 62 is provided vertically on the circulation base plate 61, and an advancing/retreating unit 63 and a scale unit 64 are provided on the measuring unit supporting base plate 62.

First, description will be given on the advancing/retreating unit 63.

An advancing/retreating guide rail 65 extending in a direction perpendicularly crossing the center line 43 is provided on the measuring unit supporting base plate 62. A measuring unit holder 66 is slidably provided on the advancing/retreating guide rail 65, and a contact measuring unit 67 is provided, on the measuring unit holder 66. Measuring direction of the contact measuring unit 67 is in parallel to advancing/retreating direction of the measuring unit holder 66. That is, the contact measuring unit 67 is so arranged that it is moved in radial direction, and the contact measuring unit 67 measures displacement in radial direction. As the contact measuring unit 67, an electric micrometer is used, for instance.

An advancing/retreating motor 68 is integrally provided on the measuring unit holder 66. The advancing/retreating motor 68 has an output shaft 69 extending in parallel to the center line 43, and a pinion gear 71 is fitted on the output shaft 69. On the measuring unit supporting base plate 62, a rack 72 is fixed in a direction to perpendicularly cross the center line 43, and the pinion gear 71 is engaged with the rack 72.

It is to be noted that in the figure, reference numeral 73 denotes an escape hole to avoid interference with the output shaft 69. When the advancing/retreating motor 68 is driven, the pinion gear 71 is rotated and it is so arranged that the advancing/retreating motor 68 and the advancing/retreating unit 63 are integrally moved forward or backward in radial direction (in up-to bottom direction in the figure).

It is to be noted that in the figure, reference numeral 75 denotes a contact. The contact 75 is brought into contact with a measuring point, and a displacement of the contact 75 is detected by the contact measuring unit 67.

The scale unit 64 has a linear scale 76 disposed in parallel to the advancing/retreating guide rail 65 and a scale sensor 77 integrally provided with the measuring unit holder 66, and the scale sensor 77 is displaced integrally with displacement of the measuring unit holder 66. It is so arranged that the scale sensor 77 reads displacement amount from the linear scale 76, and that the scale sensor 77 detects displacement in radial direction of the measuring unit holder 66.

Further, a measured value to be read by the scale sensor 77 and a position of the contact 75 are a known value A. For instance, when the known value A is added to the measured value of the scale sensor 77, a distance from the center line 43 to the contact 75 can be obtained.

An amount of advancing/retreating of the measuring unit holder 66, i.e. a stroke of the contact measuring unit. 67, is related to measurement range of inner diameter, which can be measured by the contact measuring unit 4. Therefore, stroke of the contact measuring unit 67 is set to the stroke, which can cover measuring range (2L tan θ1/2 to 2L tan θ/2) of the non-contact measuring unit 3.

It is to be noted that in the figure, reference numeral 78 denotes a cable holder to fix cables and the like (not shown).

The measuring unit supporting base plate 62, the advancing/retreating unit 63, the scale unit 64, the cable holder 78, etc. are covered by a measuring head cover 79 in cylindrical shape, and a measurement window 81 is prepared on the measuring head cover 79 so that the contact measuring unit 67 can protrude. An outer diameter of the measuring head cover 79 is the same as diameter of the circulation unit cover 58, and is shorter than inner diameter of the object to be measured.

Further, an arrangement and a weight of the components (the measuring unit holder 66, the advancing/retreating motor 68, the scale sensor 77, etc.) of the contact measuring head 42 are set up so that a center of gravity of the contact measuring head 42 exists on the center line 43 or approximately on the center line 43 or that in a case where the measuring unit holder 66 is moved, the center of gravity of the contact measuring head 42 exist within a predetermined range with the center line 43 as the center. Further, in a case where the position of the center of gravity does not come on the center line 43 only by the arrangement of the components, the position of the center of gravity of the contact measuring head 42 is adjusted by providing a balance weight as appropriate. Here, the predetermined range means a range where no variation occurs on the measured value due to decentering from the center of gravity when the contact measuring head 42 is circulated.

Description will be given below about operation.

The inner diameter measuring device 1 as supported on the supporting member 2 is inserted into a hollow object to be measured (e.g. a pipe to be measured) on non-contact basis. When the inner diameter measuring device 1 is cc be inserted, the contact 75 is set to a condition where the contact 75 is completely retreated from outer surface of the measuring head cover 79.

Measurement is performed, while the inner diameter measuring device 1 is being inserted into the pipe to be measured. The pipe to be measured may be moved while the inner diameter measuring device 1 is fixed, or the inner diameter measuring device 1 may be moved while the pipe to be measured is fixed. When the inner diameter measuring device is fixed and the pipe to be measured is moved, a measurement condition is stable because a vibration caused by the movement is not applied on the inner diameter measuring device 1.

When a laser beam 21 is projected from the laser emitter 20, the laser beam 21 is reflected over total circumference by the cone mirror 29. Reflected laser beam 21' passes through the total circumferential light transmitting window 30 and is projected to inner surface of the hollow portion, and an optical ring is formed. An image of this optical ring is picked up by the camera 16, and an image data is transmitted to the measuring unit main part. A diameter, and further, a profile are measured by image processing at the measuring unit main part. Measurement results are stored in a storage unit of the measuring unit main part.

Further, at the same time, an inner diameter is measured by the contact measuring unit 4.

By the advancing/retreating unit 63, the measuring unit holder 66 is moved immediately before the position where the contact 75 is brought into contact with inner surface. Then, by moving gradually, the contact 75 is brought into contact with inner surface of the object to be measured. At this moment, from a detected value of the contact measuring unit 67 and from an amount of moving of the measuring unit holder 66 detected by the scale sensor 77, the inner diameter of the object to be measured can be measured.

Further, the circulation motor 52 is driven, and circulation shaft 48 is rotated via the circulation driving gear 53 and the circulation gear 51. Further, the contact measuring head 42 is rotated via the circulation flange 49. By rotating the contact measuring head 42 at a predetermined angular pitch, the inner diameter can be measured over total circumference of the object to be measured.

In this case, because position of the center of gravity of the contact measuring head 42 is set on the center line 43, a deviation of the measuring point and a change of measurement result due to the rotation of the contact measuring head 42 can be prevented. Further, because the profile of the hollow portion can be identified by measurement of the non-contact measuring unit 3, points to be measured by the contact measuring unit 4 may be fewer, so the measurement time can be shortened. Measurement results by the contact measuring unit 4 are stored in storage unit of the measuring unit main part.

When the measurement of total inner circumference by the contact measuring unit 4 has been completed, the inner diameter measuring device 1 is moved by a predetermined distance in axial direction, and measurements by the non-contact measuring unit 3 and the contact measuring unit 4 are repeated. It is to be noted that, if a moving distance and a moving pitch are set up so that the points to be measured by the contact measuring unit 4 are measured by the non-contact measuring unit 3, the result measured by the non-contact measuring unit 3 can be corrected by the contact measuring unit 4, and a measurement accuracy of the non-contact measuring unit 3 can be improved.

By measuring the inner diameter according to the present embodiment, the inner diameter can be measured with high accuracy by the contact measuring unit 4, and at the same time, the profiling of inner surface by the non-contact measuring unit 3 can be carried out. Further, by combining a contact type measurement by the contact measuring unit 4 and a non-contact type measurement by the non-contact measuring unit 3, the time required for the measurement can be shortened.

Further, because the non-contact measuring unit 3 and the contact measuring unit 4 are designed in such shapes that these can be included within the same cylindrical surface, and further, since an outer diameter of the supporting member 2 is smaller than the cylindrical surface, by setting the supporting member 2 to a length corresponding to the length of the pipe to be measured, even when the pipe to be measured is a long member, it is possible to perform the measurement of inner diameter and the measurement of profile over total length.

Further, the measurement by the non-contact measuring unit 3 and the measurement by the contact measuring unit 4 may be carried out at the same time as described, above, or the measurement may be carried out by one of them.

Figure 7A:
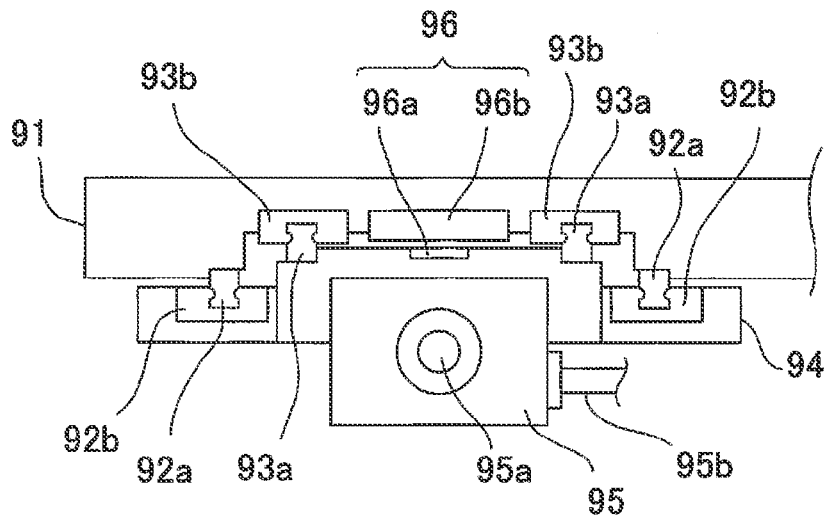
FIG. 7A is a plane view of a contact measuring head.
Figure 7B:
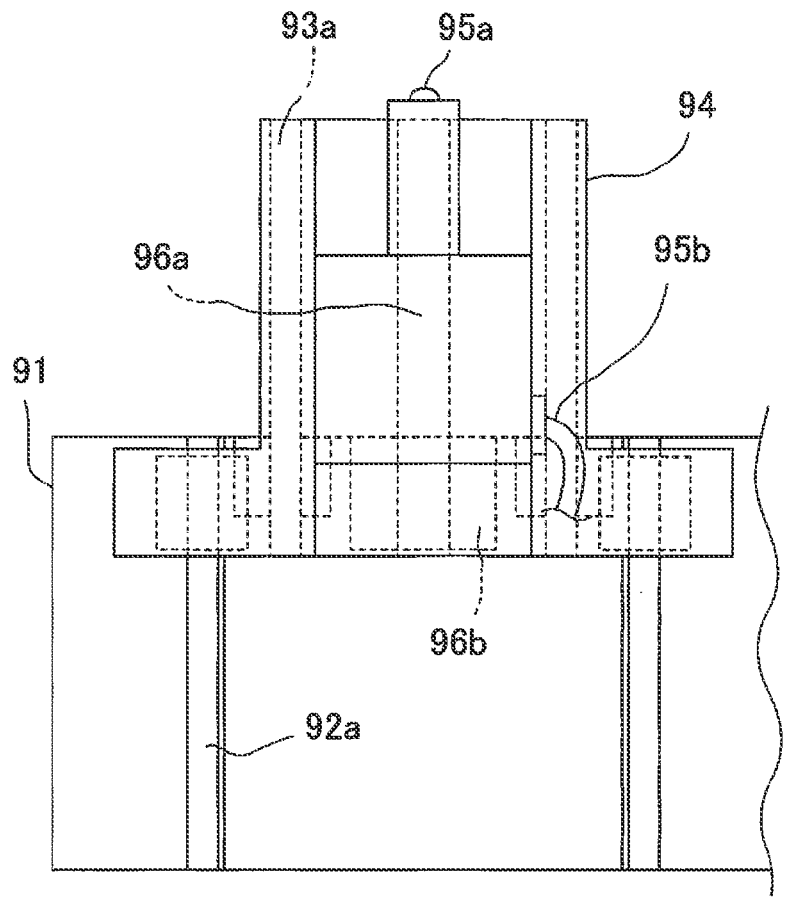
FIG. 7B is a front view of a condition where the contact measuring unit is protruded.

Next, by referring to FIG. 5 to FIG. 7, description will be given below on other examples of the contact measuring head 42.

The contact measuring head 42 comprises a measuring unit supporting base plate 91, a first linear guide 92 (92a and 92b) and a second linear guide 93 (93a and 93b), a table 94 movably supported on the measuring unit supporting base plate 91 via the linear guides 92 and 93, a contact measuring unit 95 to be disposed on front surface of the table 94, and a linear scale 96, which has a scale 96a to be disposed on back surface of the table 94 and a detecting means 96b to be disposed on the measuring unit supporting base plate 91 so as to oppose the scale 96a.

Figure 5:
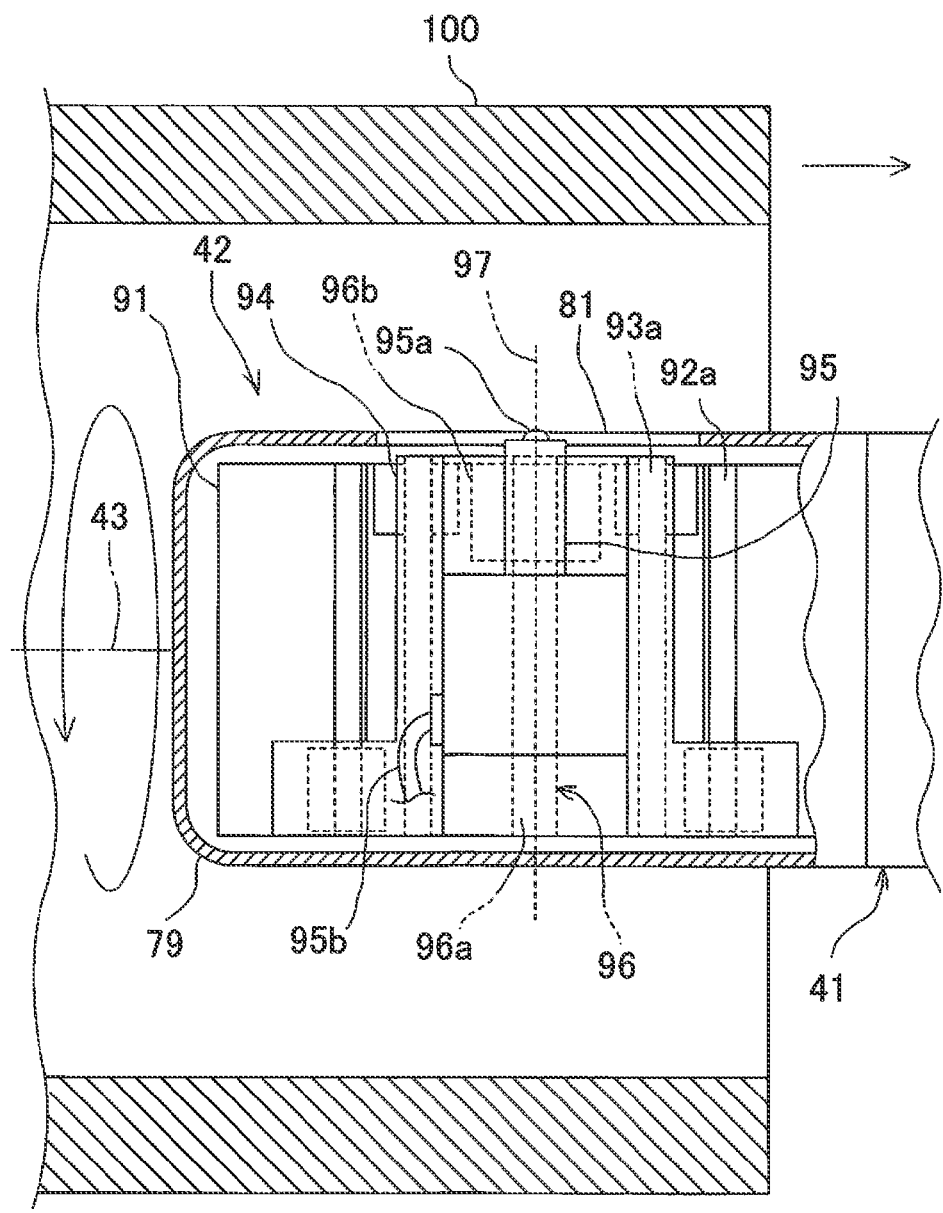
FIG. 5 is a cross-sectional view of a contact measuring head according to another example of the present invention.

As shown in FIG. 5, she measuring unit supporting base plate 91 is fixed perpendicularly on the circulation unit 41 and rotates integrally with the rotation of the circulation unit 41. Further, the measuring unit supporting base plate 91 supports the table 94, which holds the contact measuring unit 95 via the linear guides 92 and 93.

The first linear guide 92 has two sets of an advancing/retreating guide rails 92a and a block 92b, and the second linear guide 93 has two sets of an advancing/retreating guide rail 93a and a block 93b. On each of the linear guides 92 and 93, the advancing/retreating guide rails 92a and 93a and the blocks 92b and 93b are engaged respectively, and the blocks 92b and 93b are slidably configured along the advancing/retreating guide rails 92a and 93a.

FIG. 6A is a front view of the measuring unit supporting base plate 91, and FIG. 6B is a rear view of the table 94. As shown in FIG. 5 and FIG. 6A, two advancing/retreating guide rails 92a of the first linear guide 92 are installed perpendicularly cross the center line 43 of rotation of the circulation unit 41. As shown in FIG. 5 and FIG. CE, on rear surface of the table 94, the block 92b of the first linear guide 92 is installed respectively at a position opposite to each of the advancing/retreating guide rails 92a.

Further, as shown in FIG. 5 and FIG. 6B, on back surface of the table 94, two advancing/retreating guide rails 93a of the second linear guide 93 are disposed to perpendicularly cross the center line 43. Also, as shown in FIG. 5 and FIG. 6A, on the measuring unit supporting base plate 91, the block 93b of the second linear guide 93 is disposed respectively at a position to oppose each of the advancing/retreating guide rails 93a.

Being guided by the linear guides 92 and 93, the table 94 slides in a direction to perpendicularly cross the center line 43 on the measuring unit supporting base plate 91. Also, the contact measuring unit 95 held on the front surface of the table 94 is moved integrally with she table 94. The sable 94 is moved slidably by the advancing/retreating motor 68. Because the mechanism of advancing/retreating is the same as in the contact type measuring head 42, description is not given here.

The contact measuring unit 95 has a contact 95a, and the contact 95a is brought into contact with inner wall of the object to be measured 100 and measures displacement of the contact 95a. As described above, a measuring direction of the contact measuring unit 95 runs in parallel to advancing/retreating direction of the table 94. That is, the contact measuring unit 95 moves in radial direction of the space of the object to be measured 100 and measures a displacement in radial direction. A value measured by the contact measuring unit 95 is outputted to a calculating means (not shown) via a cable 95b. The measuring unit supporting base plate 91 is fixed on the circulation unit 41 so that a center line 97 in measuring direction of the contact measuring unit 95 perpendicularly crosses a rotation axis of the circulation unit 41.

As shown in FIG. 6B, on back surface of the table 94, the scale 96a of the linear scale 96 is provided between two advancing/retreating guide rails 93a in parallel to the advancing/retreating guide rails 93a. Also, at a position to oppose the scale 96 on the measuring unit supporting base plate 91, the detecting means 96b of the linear scale 96 is provided. The linear scale 96 is a means for detecting length, and a length is measured by the detecting means 96b in graduation of the scale 96a.

Based on a value as inputted from the contact measuring unit 95 and on a value inputted from the linear scale 96, the calculating means determines inner diameter of the object to be measured 100.

As described above, each of the advancing/retreating guide rails 92a of the first linear guide 92 are installed at left-to-right symmetrical positions with the center line 97 of the contact measuring unit 95 as reference. Also, each of the advancing/retreating guide rails 93a of the second linear guide 93 are installed at left-to-right symmetrical positions with the center line 97 of the contact measuring unit 95 as reference. Further, while the advancing/retreating guide rails 92a are installed on the measuring unit supporting base plate 91, the advancing/retreating guide rails 93a are installed on the table 94 to oppose to the measuring unit supporting base plate 91. Therefore, at the contact measuring head 42, the table 94 can be supported stably in three-dimensional direction. Values can be measured accurately by the contact measuring unit 95 and the linear scale 96, and measurement results can be obtained with high accuracy. Also, because the linear scale 96 is installed between the linear guides 92 and 93, stable values can be obtained.

As described above, according to the present embodiment, an accurate inner diameter can be measured with high accuracy.

INDUSTRIAL APPLICABILITY

According to the present invention, an inner diameter measuring device has a non-contact measuring unit and a contact measuring unit arranged along the same center line, wherein the non-contact measuring unit comprises an image pickup unit arranged on the center line, a laser beam emitting unit, and a laser beam diffusing unit having a cone mirror, wherein a laser beam projected from the laser beam emitting unit to the cone mirror is reflected over a total circumference by the cone mirror, the image pickup unit takes an optical ring which is formed by projecting the reflected laser beam to an inner surface of a hollow portion, at least one of an inner diameter or a shape of the inner surface is measured based on an image picked up, and wherein the contact measuring unit comprises a contact measuring head and a circulation unit for circulating the contact measuring head around the center line, wherein the contact measuring head has a contact measuring unit having a contact at a forward end and for detecting a displacement of the contact, an advancing/retreating unit for advancing and retreating the contact measuring unit in radial direction, and a scale unit for measuring an advancing/retreating distance of the contact measuring unit. As a result, measurement of inner diameter can be performed with high accuracy by the Contact measuring unit, and a measurement of inner diameter and a shape of inner surface can be carried out at the same time on non-contact basis by the non-contact measuring unit. Further, by combining the measurement of contact type on the contact measuring unit and the measurement of non-contact type on the non-contact measuring unit, measurement time can be shortened.

LEGEND OF REFERENCE NUMERALS

1 Inner diameter measuring device
2 Supporting member

3 Non-contact measuring unit
4 Contact measuring unit
6 Image pickup unit
7 Laser beam emitting unit
8 Centering unit
9 Laser beam diffusing unit
16 Camera
18 Axis adjusting mechanism
20 Laser emitter
21 Laser beam
29 Cone mirror
41 Circulation unit
42 Contact measuring head
48 Circulation shaft
49 Circulation flange
52 Circulation motor
54 Circulation restricting means
62 Measuring unit supporting base plate
63 Advancing/retreating unit
64 Scale unit
66 Measuring unit holder
67 Contact measuring unit
68 Advancing/retreating motor
72 Rack
75 Contact
76 Linear scale
77 Scale sensor
81 Measurement window
91 Measuring unit supporting base plate
92 First linear guide
93 Second linear guide
94 Table

The invention claimed is:

1. An inner diameter measuring device, having a non-contact measuring unit and a contact measuring unit arranged along the same center line,
wherein said non-contact measuring unit comprises an image pickup unit arranged on said center line, a laser beam emitting unit, and a laser beam diffusing unit having a cone mirror, wherein a laser beam projected from said laser beam emitting unit to said cone mirror is reflected over a total circumference by said cone mirror, said image pickup unit takes an optical ring which is formed by projecting the reflected laser beam to an inner surface of a hollow portion, at least one of an inner diameter or a shape of the inner surface is measured based on an image picked up, and wherein said contact measuring unit comprises a contact measuring head and a circulation unit for circulating said contact measuring head around said center line, wherein said contact measuring head has a contact measuring unit having a contact at a forward end and for detecting a displacement of said contact, an advancing/retreating unit for advancing and retreating said contact measuring unit in radial direction, and a scale unit for measuring an advancing/retreating distance of said contact measuring unit.

2. An inner diameter measuring device according to claim 1, wherein said non-contact measuring unit and said contact measuring unit are configured so as to be included within the same cylindrical surface.

3. An inner diameter measuring device according to claim 1, further comprising a centering unit arranged on the same center line, wherein said laser beam emitting unit is mounted on said centering unit via said centering unit, the position of said centering unit can be adjusted in two directions perpendicularly crossing with respect to the center line of said laser beam, and also, a tilting of an optical axis of said laser beam emitting unit can be adjusted.

4. An inner diameter measuring device according to claim 1, wherein said contact measuring head is so arranged that a center of gravity of said contact measuring head exists within a predetermined range with said center line as the center.

5. An inner diameter measuring device according to claim 1, wherein said contact measuring unit is provided on a measuring unit holder movable in radial direction along an advancing/retreating guide rail, a linear scale is provided in parallel to said advancing/retreating guide rail, a scale sensor is provided on said measuring unit holder, and the advancing/retreating distance of said contact measuring unit is measured by said scale sensor.

6. An inner diameter measuring device according to claim 1, wherein said contact measuring head has a measuring unit supporting base plate circulated by said circulation unit, said advancing/retreating unit is provided on said measuring unit supporting base plate via two sets of linear guides, each linear guide comprises a pair of advancing/retreating guide rails and a pair of blocks respectively slidably engaged with said advancing/retreating guide rail,
wherein with respect to one of the linear guides, said advancing/retreating guide rail is provided on said measuring unit supporting base plate and said block is provided on said advancing/retreating unit, and with respect to the other of the linear guides, said advancing/retreating guide rail is provided on said advancing/retreating unit and said block is provided on said measuring unit supporting base plate.

7. An inner diameter measuring device according to claim 4, wherein said contact measuring head has a measuring unit supporting base plate circulated by said circulation unit, said advancing/retreating unit is provided on said measuring unit supporting base plate via two sets of linear guides, each linear guide comprises a pair of advancing/retreating guide rails and a pair of blocks respectively slidably engaged with said advancing/retreating guide rail,
wherein with respect to one of the linear guides, said advancing/retreating guide rail is provided on said measuring unit supporting base plate and said block is provided on said advancing/retreating unit, and with respect to the other of the linear guides, said advancing/retreating guide rail is provided on said advancing/retreating unit and said block is provided on said measuring unit supporting base plate.

* * * * *